US009045224B2

(12) United States Patent
Gölling et al.

(10) Patent No.: US 9,045,224 B2
(45) Date of Patent: *Jun. 2, 2015

(54) HIGH LIFT SYSTEM FOR AN AIRCRAFT (75) Inventors: Burkhard Gölling, Buchholz (DE); Thomas Lorkowski, Taufkirchen (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/530,151

(22) Filed: Jun. 22, 2012

(65) Prior Publication Data

US 2013/0026300 A1    Jan. 31, 2013

Related U.S. Application Data (63) Continuation of application No. PCT/EP2010/007924, filed on Dec. 23, 2010.

(60) Provisional application No. 61/289,474, filed on Dec. 23, 2009.

(30) Foreign Application Priority Data

Dec. 23, 2009   (DE) .......................... 10 2009 060 325

(51) Int. Cl.
  *B64C 3/00*       (2006.01)
  *B64C 21/04*      (2006.01)
  (Continued)

(52) U.S. Cl.
  CPC . *B64C 21/04* (2013.01); *B64C 9/16* (2013.01); *B64C 9/38* (2013.01); *Y02T 50/166* (2013.01); *Y02T 50/44* (2013.01)

(58) Field of Classification Search
  USPC ................ 244/215, 213, 53 B, 207, 208, 211
  See application file for complete search history.

(56) References Cited

U.S. PATENT DOCUMENTS 1,878,775 A *  9/1932  Henry ........................... 244/215
2,160,281 A    5/1939  Price
(Continued)

FOREIGN PATENT DOCUMENTS

BE       358 128       2/1929
CN     101267980       9/2008
(Continued)

OTHER PUBLICATIONS

International Search Report for Application Serial No. WO 2011/076428 A3 dated Aug. 12, 2011.

(Continued)

*Primary Examiner* — Tien Dinh
*Assistant Examiner* — Michael A Fabula
(74) *Attorney, Agent, or Firm* — Jenkins, Wilson, Taylor & Hunt, P.A.

(57) ABSTRACT

A high lift system with a main wing and regulating flaps, also bearing devices for the mounting of the regulating flaps, and positioning devices for the positioning of the regulating flaps, wherein the respective bearing device and/or positioning device is at least partially provided with a fairing, having a flow control device for purposes of controlling the flow around the high lift system with at least one inlet duct with at least one inlet, which device is located on or underneath the lower face of the high lift system, wherein at least one outlet duct for air is furthermore provided, which is connected with the inlet duct in a fluid-communicating manner, and has at least one outlet, which is located on the upper face in the region of at least one regulating flap of the high lift system.

18 Claims, 5 Drawing Sheets (51) Int. Cl.
*B64C 9/16* (2006.01)
*B64C 9/38* (2006.01)

(56) References Cited

U.S. PATENT DOCUMENTS

| | | | | |
|---|---|---|---|---|
| 2,169,416 | A | * | 8/1939 | Griswold ............... 244/216 |
| 2,229,020 | A | * | 1/1941 | Griswold ............... 244/212 |
| 2,334,975 | A | * | 11/1943 | Williams ............... 244/216 |
| 2,346,326 | A | * | 4/1944 | Peed, Jr. et al. ....... 244/216 |
| 2,366,751 | A | * | 1/1945 | Read ................... 244/212 |
| 2,772,058 | A | * | 11/1956 | Grant .................. 244/216 |
| 2,920,844 | A | * | 1/1960 | Marshall et al. ....... 244/207 |
| 3,009,668 | A | | 11/1961 | Nystrom |
| 3,144,220 | A | * | 8/1964 | Kittelson .............. 244/203 |
| 3,145,950 | A | * | 8/1964 | Circenis ............... 244/216 |
| 3,332,644 | A | * | 7/1967 | Whittley ............... 244/207 |
| 3,447,763 | A | | 6/1969 | Allcock |
| 3,576,301 | A | | 4/1971 | Stickle |
| 3,583,660 | A | * | 6/1971 | Hurkamp et al. ....... 244/207 |
| 3,677,504 | A | * | 7/1972 | Schwarzler ............ 244/212 |
| 3,767,140 | A | * | 10/1973 | Johnson ............... 244/216 |
| 3,920,203 | A | * | 11/1975 | Moorehead ............ 244/207 |
| 3,921,942 | A | * | 11/1975 | Bracka ................ 244/87 |
| 4,015,787 | A | * | 4/1977 | Maieli et al. .......... 244/215 |
| 4,120,470 | A | * | 10/1978 | Whitener .............. 244/213 |
| 4,131,252 | A | * | 12/1978 | Dean et al. ........... 244/212 |
| 4,398,688 | A | | 8/1983 | Williams |
| 4,705,236 | A | * | 11/1987 | Rudolph ............... 244/90 R |
| 4,720,066 | A | | 1/1988 | Renken et al. |
| 5,366,177 | A | | 11/1994 | Decoux |
| 5,447,763 | A | | 9/1995 | Gehlke |
| 5,772,165 | A | | 6/1998 | Schroder et al. |
| 6,253,126 | B1 | | 6/2001 | Palmer |
| 7,243,881 | B2 | * | 7/2007 | Sakurai et al. ......... 244/212 |
| 7,255,309 | B2 | | 8/2007 | Boldrin et al. |
| 8,690,107 | B2 | * | 4/2014 | Golling ............... 244/208 |
| 2003/0150962 | A1 | | 8/2003 | Orban |
| 2006/0196633 | A1 | | 9/2006 | Mahjoub |
| 2006/0261217 | A1 | * | 11/2006 | Voogt ................. 244/216 |
| 2007/0034746 | A1 | | 2/2007 | Shmilovich |
| 2007/0095982 | A1 | | 5/2007 | Kismarton et al. |
| 2012/0001028 | A1 | | 1/2012 | Frey et al. |
| 2013/0009015 | A1 | * | 1/2013 | Golling ............... 244/203 |
| 2013/0026300 | A1 | | 1/2013 | Goelling et al. |
| 2013/0240676 | A1 | * | 9/2013 | Golling ............... 244/208 |

FOREIGN PATENT DOCUMENTS

| | | |
|---|---|---|
| DE | 10 2009 011 662 A1 | 9/2010 |
| DE | 10 2009 060 325 | 6/2011 |
| DE | 10 2010 010 577 | 9/2011 |
| EP | 0 068 737 | 6/1982 |
| WO | WO 2010/084025 | 7/2010 |
| WO | WO 2011/076428 | 6/2011 |
| WO | WO 2011/110327 | 9/2011 |

OTHER PUBLICATIONS

International Search Report for WO 2011/110327 dated Sep. 13, 2011.

Non-Final Office Action for U.S. Appl. No. 13/608,035 dated Jun. 6, 2014.

Pending U.S. Appl. No. 13/608,035, filed Sep. 10, 2012.

* cited by examiner

HIGH LIFT SYSTEM FOR AN AIRCRAFT

CROSS-REFERENCE TO RELATED APPLICATIONS

The present application is a continuation of International Application No. PCT/EP2010/007924, filed on Dec. 23, 2010, which claims priority from German Application DE 10 2009 060 325.5, filed on Dec. 23, 2009, and claims the benefit of U.S. Provisional application 61/289,474, filed on Dec. 23, 2009, each of which is hereby incorporated in its entirety by reference.

FIELD OF THE INVENTION

The invention concerns a high lift system with a main wing and regulating flaps, also guiding devices for guiding the movement of the regulating flaps, and adjusting devices for the adjusting of the regulating flaps, and also a flow control device for purposes of controlling the flow around the main wing and the flaps.

BACKGROUND

High lift systems of this type are often designed such that in the extended position of the flap a gap between a regulating flap of the high lift system and the main wing is formed. For improving the lift, the gap is defined such that, under certain flight conditions, a defined quantity of air can pass through this gap from the lower face of the high lift system onto the upper face of the high lift system, in particular of the regulating flap. The gap geometry ensures a lift state as a function of the aerodynamic geometry of the whole high lift system. In the retracted state, no gap is present, and as a result it is not possible to supply the flow above the high lift system with a flow of air from the lower face of the high lift system.

SUMMARY

With the solution according to various embodiments of the invention, in low-speed flight, e.g. during landing or takeoff, separation of the flow on the regulating flap under such flight conditions can be improved, despite that the supply of air via the gap between the main wing and the flap onto the upper face of the high lift system takes place relatively inexactly, and in particular in an uncontrolled manner, as this air flow is dependent on the current flow condition and, for example, on gusts.

A high lift system in accordance with various embodiments of the invention has a main wing and regulating flaps, also guiding or bearing devices for the mounting of the regulating flaps and guiding the movement thereof, and adjusting or positioning devices for the adjusting or positioning of the regulating flaps, wherein the respective guiding device and/or positioning device is provided at least partially with a covering or fairing. Furthermore a flow control device is provided for purposes of controlling the flow at least around the high lift system and in particular around the flap; the flap includes at least one inlet duct with at least one inlet, which is located on or underneath the lower face of the high lift system, and furthermore has at least one outlet duct for air, which is connected with the inlet duct in a fluid-communicating manner, and at least one outlet. This outlet is located on the upper face of the high lift system in the region of at least one regulating flap of the high lift system. Here the term "region" is to be understood to include both the surface of the respective regulating flap itself on the upper face of the high lift system, and also a region around this surface of the regulating flap. The region can thereby amount to up to 60% of the projection of the corresponding regulating flap in the flap chordwise direction on the neighbouring part of the high lift system, in particular on the main wing. In particular, the outlet is located on the suction side of the flap and within the first 50% and especially the first 30% of the complete chord length in an area which starts on the front end of the flap, when seen in a direction oriented opposite to the chord direction of the flap. The flow control device is arranged at least partially within the fairing and the inlet duct at the at least one inlet is running along the main wing chordwise direction (H-KT) of the high lift system.

In this manner control of the flow is not only possible on the respective regulating flap, but also in the region situated upstream of this regulating flap, as viewed in the flight direction. Thus even with a delayed action of the flow control, having regard to the flight direction, control can be exerted on the regulating flap, i.e. vis-à-vis flow separation. Furthermore with a high lift system in accordance with various embodiments of the invention, the flow control device is arranged at least partially within the covering. The at least one inlet of the flow control device is thereby facing towards the main wing chordwise direction of the high lift system. In this manner two important objectives can be achieved. On the one hand the undesirable influence on the flow on the lower face of the high lift system can be reduced or avoided altogether by the arrangement of the flow control device within the covering, usually also denoted as a "fairing". The aerodynamically-optimised outer contour of the fairing thus serves not only the aerodynamics of the flow around the lower face of the high lift system, but also the accommodation of at least a proportion of the flow control device. To achieve the volumetric flow of air necessary for controlling the flow, air from outside the high lift system is introduced into this flow control device via the inlet of the flow control device.

A second great advantage of such a system is that it can be configured to operate in a passive manner. This is achieved by turning the inlet towards the main wing chordwise direction of the high lift system. Here the term "facing towards" the main wing chordwise direction is to be understood to mean that at least a proportion of the inlet opening's cross-section opens in the direction of the main wing chordwise direction. Designs that have inlet opening cross-sections that are parallel to the main wing chordwise direction are thus excluded. In this manner the air flowing on the lower face of the high lift system can in accordance with various embodiments of the invention penetrate unhindered into at least the facing part of the inlet cross-section and can enter into the inlet duct of the flow control device. The impingement of high-pressure air onto the flow control device thus takes place automatically or, that is to say, passively by means of the movement of the whole high lift system, together with an aircraft, for example. The control of the flow on the lower face of the high lift system is thereby reduced to a minimum, since only the necessary quantity of air is extracted through the minimal opening of the inlet from this lower face flow, while the remaining flow runs in an aerodynamically optimised manner along the fairing underneath the high lift system. By means of the embodiment in accordance with the invention, a passive system is thus constituted that is easy to configure in structural terms and at the same time is fitted onto the lower face flow of the high lift system with few aerodynamic disadvantages.

It can be advantageous if in a high lift system in accordance with various embodiments of the invention at least one inlet is embodied as an opening in the fairing. The further fusion of inlet duct, inlet and fairing is even better from the aerodynamic point of view. The constitution of the inlet directly in the fairing thus enables a seamless transition between the flow control device within the fairing and the fairing itself. This signifies that no element of the flow control device projects out of the fairing, but rather the inlet duct finishes flush with its inlet on the fairing itself. Here the inlet can have a wide variety of geometrical shapes. In addition to simple round or elliptical cross-sections, which can be practical with different angles of inclination to the main wing chordwise direction, so as to achieve the effective flow cross-section that is necessary for the quantity of air required to control the flow, complex geometries or even blended sections can also be advantageous, which ensue automatically, so to speak, as a result of a flush finish with the fairing of the high lift system. Here with the provision of more than one inlet for the flow control device in an advantageous manner a symmetrical arrangement of the inlets is provided, and at the same time an advantageously even number of inlets of the flow control device, such as, for example, two, four or six.

In a high lift system in accordance with various embodiments of the invention, an inlet shut-off or opening and closing device can be provided for at least one inlet. Such inlet opening and closing devices can be configured in a wide variety of ways. Thus it is, for example, possible for this inlet opening and closing device to operate in a purely mechanical or piezoelectric manner. Elastic materials or electrically activated elastic materials can also be used in the embodiment of the inlet opening and closing device. So-called smart elastic materials, which, for example, open once a certain back pressure has been exceeded, like a pressure relief valve, can also be practically deployed. Here it should be noted that both an active activation of the inlet opening and closing device, and also a passive, that is to say, automatic embodiment of these inlet opening and closing devices can be practical for the functionality of various embodiments of the present invention. In particular the passive embodiment of the inlet opening and closing device can be of great advantage in terms of least possible complexity and the necessity for weight reduction. With the need for active control under a wide variety of flight conditions, however, it can also be of advantage if the inlet opening and closing device can also operate actively, for example, in the form of mechanically controllable flaps. Further sensors are advantageous for both active and passive systems, or also combinations of the two variants; these sensors control and monitor the current flow conditions of the high lift system, in particular in the regions that are to be controlled by the flow control device. These sensors can, on the one hand, be processed by the central control logic of the high lift system, or by an aircraft fitted with such control logic; however, they can also be processed in a decentralised manner, that is to say in the flow lift system itself, for purposes of controlling the inlet opening and closing devices.

Furthermore, in a high lift system in accordance with various embodiments of the invention, an outlet shut-off device or opening and closing for at least one outlet can also be provided. The outlet opening and closing device can, as already explained in a detailed manner for the inlet opening and closing device, also be structurally embodied in an identical manner. An additional option for the outlet device is automatic opening when a certain internal pressure has been exceeded. A pressure relief valve can, so to speak, be used in this manner to control the outlet of air from the outlet of the flow control device via the flow control device in a passive manner.

In a high lift system in accordance with various embodiments of the invention, it can be advantageous if the inlet opening and closing device and/or the outlet opening and closing device is coupled with the positioning device for a positioning flap of the high lift system such that the status of the respective opening and closing device is determined by the setting of the regulating flap. This correlation can operate both actively and also passively. In the case of active correlation, sensors of an electrical or also a mechanical type can be present to detect the current location of the regulating flap. The detection of the location of the regulating flap by means of the actuator of the positioning device itself is also conceivable. As a function of the location of the regulating flap the inlet opening and closing device and/or the outlet opening and closing device is subsequently actively opened or closed, such that, for example, in low speed flight during the takeoff or landing procedure with an extended regulating flap, both the inlet opening and closing device and the outlet opening and closing device are opened and the flow is controlled. Passive actuation is also conceivable. Thus a kinematic coupling, for example, by means of a transmission system between the positioning device for the positioning of the regulating flaps and the inlet opening and closing device and/or the outlet opening and closing device can be provided. Such a transmission system, which is driven directly with the positioning of the regulating flap, can, for example, via further sequential mechanical systems open and/or close the inlet opening and closing device and/or the outlet opening and closing device.

Here it can be advantageous if in a high lift system in accordance with various embodiments of the invention, the degree of opening of the respective opening and closing device is a function of the setting of the regulating flap of the high lift system. This signifies that the respective opening and closing device can open and close in a quantitative manner. Thus different flows of air through the flow control device can be adjusted via the degree of opening of the inlet opening and closing device and the outlet opening and closing device. Depending on the level of necessity for flow control, which in turn can be dependent on the setting of the regulating flaps, the level of control can thus be adjusted via the degree of opening of the inlet opening and closing device and the outlet opening and closing device. But the basic, that is to say, non-quantitative, opening of the opening and closing devices can be a function of the setting of the regulating flap. Thus under flight conditions in which the regulating flap is in a neutral position, in cruise, for example, the inlets can be closed to achieve fuel-saving aerodynamics over the fairing, while opening of the opening and closing devices only takes place under flight conditions in which the regulating flap is activated, i.e., extended, for example.

In a high lift system in accordance with various embodiments of the invention, at least one inlet duct and/or at least one outlet duct can furthermore be provided with a control valve or a pump to control the volumetric flow within the flow control device. In particular with use of the flow control device under particular flight conditions a pump or control valve can optimise the flow control device even further. For example, a pump can be used to suck in additional air under particularly low-speed flight conditions, for example during the landing procedure, if the quantity of air necessary to control the flow cannot be satisfactorily guaranteed via the inlet of the flow control device under the low-speed flight condition. Thus even under low-speed flight conditions a high pressure and thus a high volumetric flow through the flow control device is possible. However, such a pump serves only to assist the control of the flow and can therefore be embodied in a relatively compact and low power design. The main load on the flow control device, in other words the majority of the air, continues to be generated in a passive manner by the flow velocity on the lower face of the high lift system. In contrast, or in parallel, to the use of a pump, a control valve can also be used, under flight conditions in which full opening of the inlet opening and closing device and outlet opening and closing device would produce too large a flow of air, which would have too great an effect on the flow. Such a control valve can reduce a diameter range of the flow control device, such that the maximum volumetric flow of air is similarly reduced. With the use of a pump and/or control valve the provision of opening and closing devices for the inlet and outlet ducts can, for example, be dispensed with, insofar as these two elements can be accommodated into a complete opening and closing device.

A high lift system in accordance with various embodiments of the invention can furthermore be fitted with a flow variator for the systematic variation of the flow of air through the flow control device. Such a flow variator can be directed in particular towards the variation of the flow with time. At a defined flight condition a volumetric air flow variation at a frequency can, for example, be generated by means of the flow variator. In particular a pulsed expulsion of the quantity of air present in the flow control device is thus possible. Here the pulsed expulsion on the upper face of the high lift system has a particularly positive effect on the local flow, in particular by reducing or preventing the separation of the flow in these regions, or even by bringing about a reattachment of the flow in this region. The flow variator can be fitted at different positions within the flow-control device. Thus a fitting directly at inlet or outlet is just as possible as the arrangement of the flow variator within the inlet duct or outlet duct. The use of a flow variator for a multiplicity of inlet and outlet ducts as a common flow variator is also conceivable.

The outlet duct can also have a Y-bifurcation, where the flow variator sits in one arm of the bifurcation, and flow can pass freely through the second arm of the bifurcation. With such an embodiment a defined basic flow of air can thus be set to flow via the free flow arm, while via the second arm and the flow variator a variable quantity of air is superposed on this basic quantity of air. In such a case, in other words, the quantity of air at the outlet of the flow control device does not fluctuate between zero and a defined value, but rather between a minimum (free arm) and a maximum value (pulsed arm).

A flow variator in accordance with various embodiments of the invention can, for example, be configured as a passively operating valve, or an actively operating pump. A passively operating valve can, so to speak, be embodied as a mechanical oscillating circuit, which enables a defined opening and closing of the valve matched to one frequency. Thus different opening and closing frequencies of the flow variator, and thus different pulse frequencies of the flow control device, can be achieved at different air speeds. Also an active embodiment in the form of a pump, which runs at a frequency-controlled rotational speed, in particular at different rotational speeds, can be deployed here. Here, in a high lift system in accordance with various embodiments of the invention, the flow variator can, for example, be arranged in the region of the at least one outlet or outlet duct. The proximity of the flow variator to the outlet has the advantage that the speed with which alterations to the pulse frequency of the flow variator reach the actual flow on the upper face of the high lift system, and thus influence the latter, is very high, and thus a very short control response time ensues. Further advantages are the low pressure losses, and also the short flow paths that thereby occur. Thus the flow on the upper face of the high lift system can be controlled, and above all, optimised effectively, quickly and very accurately by means of the flow control device.

In a high lift system in accordance with various embodiments of the invention, an activation device can furthermore be provided for the receipt of flight state data and the generation of control signals, by means of which the flow control device can be activated and deactivated under particular flight conditions. Here the terms "activation" and "deactivation" of the flow control device are to be understood to be applied to the fluid mechanical effectiveness of the flow control device. Here, for example, activation can take place by the opening of an inlet opening and closing device and/or an outlet opening and closing device of the flow control device. Although the flight state data are related in particular to the flight speed, they are also related to state data of the high lift system itself. Such flight state data of the high lift system can for example be collected by load sensors or flow sensors on the high lift system, in particular on the regulating flaps themselves, or in the region around the regulating flaps.

In order to achieve as efficient a design as possible, it can be advantageous in a high lift system in accordance with various embodiments of the invention if a distribution duct is provided between the at least one inlet duct and the at least one outlet duct. In particular this distribution duct is practical if a multiplicity of outlet ducts are to be served by a few inlet ducts. Thus a relatively large inlet duct with correspondingly large inlets can be concentrated into the fairings present under the high lift system, while via the distribution duct a multiplicity of outlet ducts and thus a multiplicity of outlets can be served on the upper face of the high lift system. In particular a multiplicity of outlets are thereby distributed over the whole of the surface of the high lift system to be controlled. Here the distribution can take place both in the chordwise direction, and also in the spanwise direction of the main wing, or the respective regulating flap. The distribution duct can in addition be intended for the accommodation of central flow variators, and/or pumps, and/or control valves. In this manner further cost and weight can be saved by means of a central element for purposes of flow control within the flow control device.

For situations in which the volumetric flow of air within the flow control device exceeds the requirement for flow control, it can be practical in a high lift system in accordance with various embodiments of the invention to bring the at least one inlet duct into fluid-communicating contact with further systems, generally designated 700, of the aircraft 1. For example, a fluid-communicating contact with the air conditioning system and the hydraulic or pneumatic systems is advantageous. In this manner pumps or additional inlets that would otherwise be required for these systems can be dispensed with, or such pumps can be designed to be more compact and also of lower power, and thus more cost-effective and weight-saving.

With a fluid-communicating connection with the air conditioning system an efficient adaptation of the cabin pressure is possible, in particular in the event of rapid changes in flight altitude. Through the passive provision of large volumetric flows of compressed air and the fluid-communicating connection of the flow control device with the pressure cabin regulating system a large quantity of air can be made available for raising the pressure in the pressure cabin relatively quickly and without additional compressors or power takeoff from the engine. This also applies to the same extent in the reverse direction, namely the relatively rapid suction, i.e. the relatively rapid release of pressure, from the pressure cabin via the multiplicity of outlets of the outlet ducts of the flow control device. The fluid-communicating connection is thus to be understood to be present in both directions, namely for purposes of raising the pressure in the cabin from the inlets and for reducing the pressure from the cabin to the outlets.

In particular in the use of a high lift system in accordance with various embodiments of the invention with a flow control device that is designed to control the adjustable regulating flaps, it can be advantageous if the ducts, in particular the inlet duct, the outlet duct, or the distribution duct are at least partially alterable in their axial projection. For example, when the regulating flaps, in particular the trailing edge flap, are displaced from the main wing, the fluid-communicating connection within the inlet duct can thus be maintained, despite an axial displacement. One possible form of embodiment for the axial variability is a design in the form of a telescopic duct, which is fitted with telescopic elements that can slide within one another. Embodiment as a bellows hose for bridging the axial variations in length is also conceivable within the framework of the present invention.

An aircraft, generally designated 1, with at least one high lift system in accordance with an embodiment of the invention is likewise a subject of the present invention. Such an aircraft, by virtue of the use of a high lift system in accordance with an embodiment of the invention, can on the one hand be constructed in a weight-reducing manner and moreover can also have improved aerodynamics under difficult flight conditions such as takeoff and landing. In addition to saving fuel these improved aerodynamics can also lead to further optimisations, such as lower stable flight speeds and thus shorter landing and takeoff procedures. Such optimisation is aimed primarily at the reduction of noise emissions.

BRIEF DESCRIPTION OF THE DRAWINGS

The present invention is described in more detail with the aid of the examples of embodiment and the following figures. In the figures.

DESCRIPTION

In order for the following description of the forms of embodiment to elucidate the respective directions as a function of the high lift system, the individual directions are defined as follows:

For the regulating flaps (110) a flap chordwise direction or general chordwise direction is defined as K-KT, a flap spanwise direction or general spanwise direction as K-SW, and a flap thickness direction or general thickness direction as K-KD. For the main wing accordingly a main wing chordwise direction or general chordwise direction is defined as H-KT, a main wing spanwise direction or general spanwise direction as H-SW, and a main wing thickness direction or general thickness direction as H-KD. The respective directions are again to be found in FIGS. 1, 2, 3 and 4.

Figure 1:
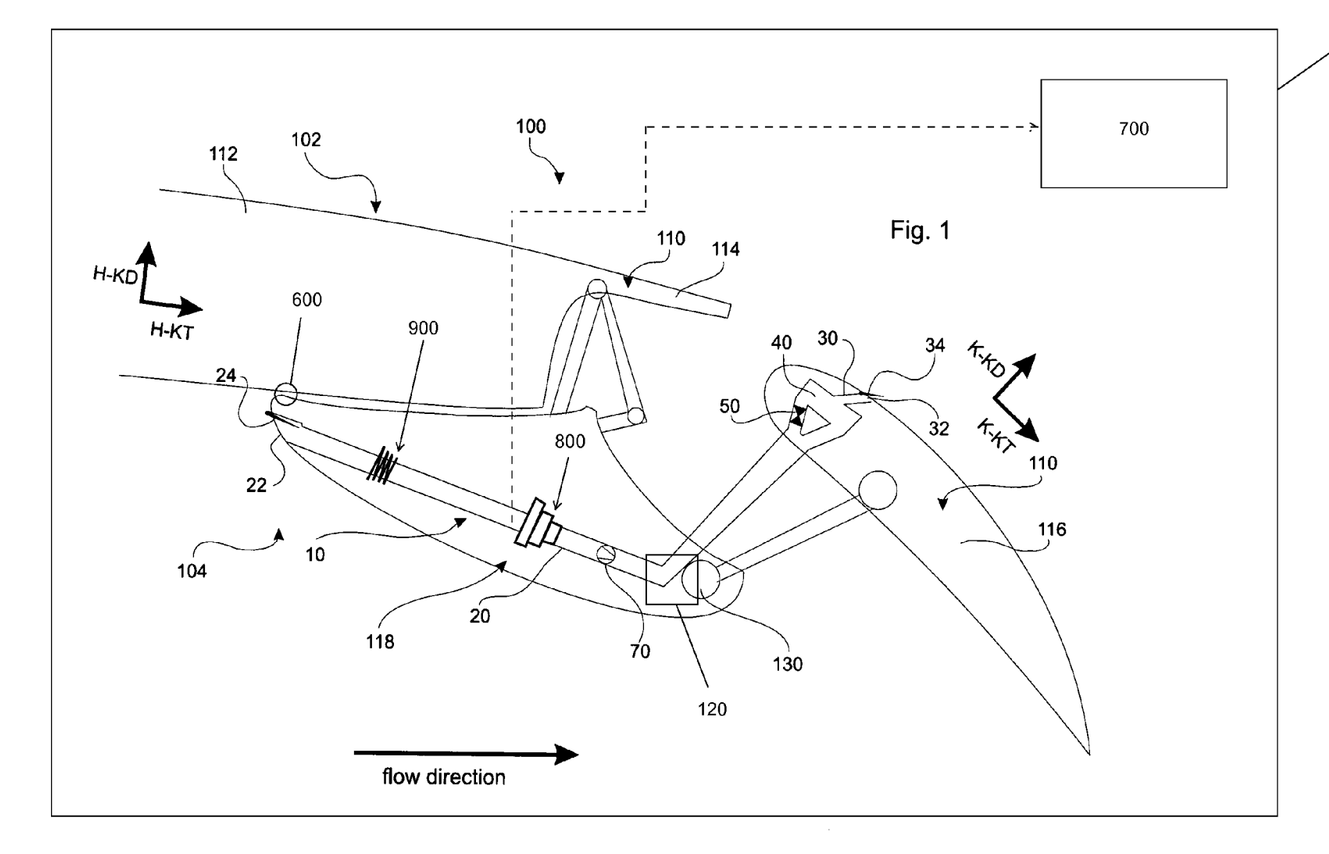
FIG. 1 shows a first example embodiment of the present invention.

FIG. 1 shows a first example embodiment of a high lift system 100. Here the high lift system 100 has a main wing 112, a spoiler 114, and also a trailing edge flap 116. The trailing edge flap 116 and the spoiler 114 are both regulating flaps 110. In FIG. 1 the trailing edge flap 116 is shown in the extended state. This extended state is, for example, deployed in the takeoff or landing procedure so as to increase the lifting surface of the high lift system and also the profile curvature of the high lift system 100.

The trailing edge flap 116 is mounted on a bearing device 130, which in turn is provided with a fairing 118. Amongst other purposes this fairing serves to achieve a defined flow around the lower face 104 of the high lift system 100. Within this fairing 118 lies the flow control device 10. Here the inlet duct 20 of the flow control device 10 runs within the fairing 118. After a bend upwards the inlet duct 20 leaves the fairing 118 and extends up to the trailing edge flap 116. A Y-bifurcation is provided within the contour of the trailing edge flap 116, which connects the inlet duct 20 with a distribution duct 40. Connecting onto the distribution duct 40 is the outlet duct 30.

Both the inlet duct 20 and also the outlet duct 30 have an opening, namely the inlet 22 and the outlet 32. Here the outlet 32 is arranged on the upper face of the trailing edge flap 116, such that by means of the flow control device 10 flowing air can be delivered onto the upper face of the trailing edge flap 116. At this point on the trailing edge flap 116 the flow on the upper face of the high lift system 100 has a tendency to separate. As a result of the additional assistance given to the flow by the flow control device 10 via the outlet 32, the separation of the flow on the trailing edge flap 116 can be avoided, or at least delayed, or even a reattachment of the flow can be brought about in this region.

In particular in the use of the high lift system 100, it can be advantageous if the ducts, in particular the inlet duct 20, the outlet duct 30, or the distribution duct 40, are at least partially alterable in their axial projection. For example, when the regulating flaps 110, in particular the trailing edge flap 116, are displaced from the main wing 112, the fluid-communicating connection within the inlet duct 20 can thus be maintained, despite an axial displacement. As illustrated in FIG. 1, one possible embodiment for the axial variability is a telescopic duct 800, which is fitted with telescopic elements that can slide within one another. Additionally, as is also illustrated in FIG. 1, another embodiment for the axial variability is a bellows hose 900 for bridging the axial variations in length.

In FIG. 1 the inlet 22 of the inlet duct 20 of the flow control device 10 is provided on the side of the fairing 118 facing towards the flow direction. While the inlet duct is in fact inclined to the direction of flow, it has an effective cross-section against the direction of flow and at the same time is inclined towards the chordwise direction of the main wing. This signifies that the inlet 22 faces against the direction of flow and is thus able to collect air from the flow on the underside 104 of the high lift system 102 and guide it into the inlet duct 20.

Here both the inlet 22 and also the outlet 32 are provided with opening and closing devices 24 and 34. In this example embodiment, the inlet opening and closing device 24 and also the outlet opening and closing device 34 are configured as mechanical flaps, which can open and close the inlet 22 and outlet 32 respectively. Here in this example embodiment in accordance with FIG. 1 the opening directions of the respective opening and closing devices 24 and 34 are aligned with the direction of flow. This signifies that an overpressure arising at the overpressure side of the opening and closing devices 24 and 34, namely on the outer face of the fairing 118 and also on the inner face of the outlet opening and closing device 34 causes the respective opening and closing devices 24 and 34 to open. Here, however, both opening and closing devices 24 and 34 can be actively activated so as to maintain the respective opening and closing devices 24 and 34 in a closed or an open state independently of the flow conditions around the respective opening and closing device. An activation device 600 can also be provided for the receipt of flight state data and the generation of control signals, of which the flow control device 10 can be activated and deactivated under particular flight conditions.

The use of mechanical opening flaps as in FIG. 1 for the opening and closing devices 24 and 34, has the further advantage that quantitative inlet control can operate in this manner. Thus via the defined opening setting of the inlet opening and closing device 24, the effective flow cross-section of the inlet 22 can be increased, or reduced, and thus the volumetric flow of air admitted can be controlled.

Furthermore in the example embodiment in FIG. 1 a pump 70 sits in the inlet duct 20; even under low-speed flight conditions this can provide the overpressure in the flow control device 10 necessary for flow control. Under a low speed flight condition the pump 70 is able to generate on its suction side a reduced pressure that sucks a quantity of air into the inlet duct 20 greater than that which would flow in through the inlet 22 as a result of just the flight speed. On the pressure side of the pump 70 this increased quantity of air is pushed in the direction of the distribution duct 40 and outlet duct 30.

In the inlet duct 20 is furthermore provided a bifurcation, where one bifurcation arm discharges into the distribution duct 40 as a free-flow bifurcation arm, and a second bifurcation arm serves as a seating for a flow variator 50 and then likewise discharges into the distribution duct 40. Needless to say, an arrangement of the flow variator 50 and the bifurcation after the distribution duct 40 is also conceivable within the framework of the present invention. A defined quantity of air, i.e. defined by the flow cross-section of the free-flow bifurcation arm, can flow continuously through the free-flow bifurcation arm into the distribution duct, and via the outlet duct 30 and the outlet 32 onto the upper face of the trailing edge flap 116. Onto this basic flow is superimposed an additional quantity of air which in a pulsating manner is allowed by the flow variator 50 into the distribution duct 40 and the outlet duct 30, such that a pulsating flow exits from the outlet 32, varying between a minimum and a maximum flow of air.

Figure 2:
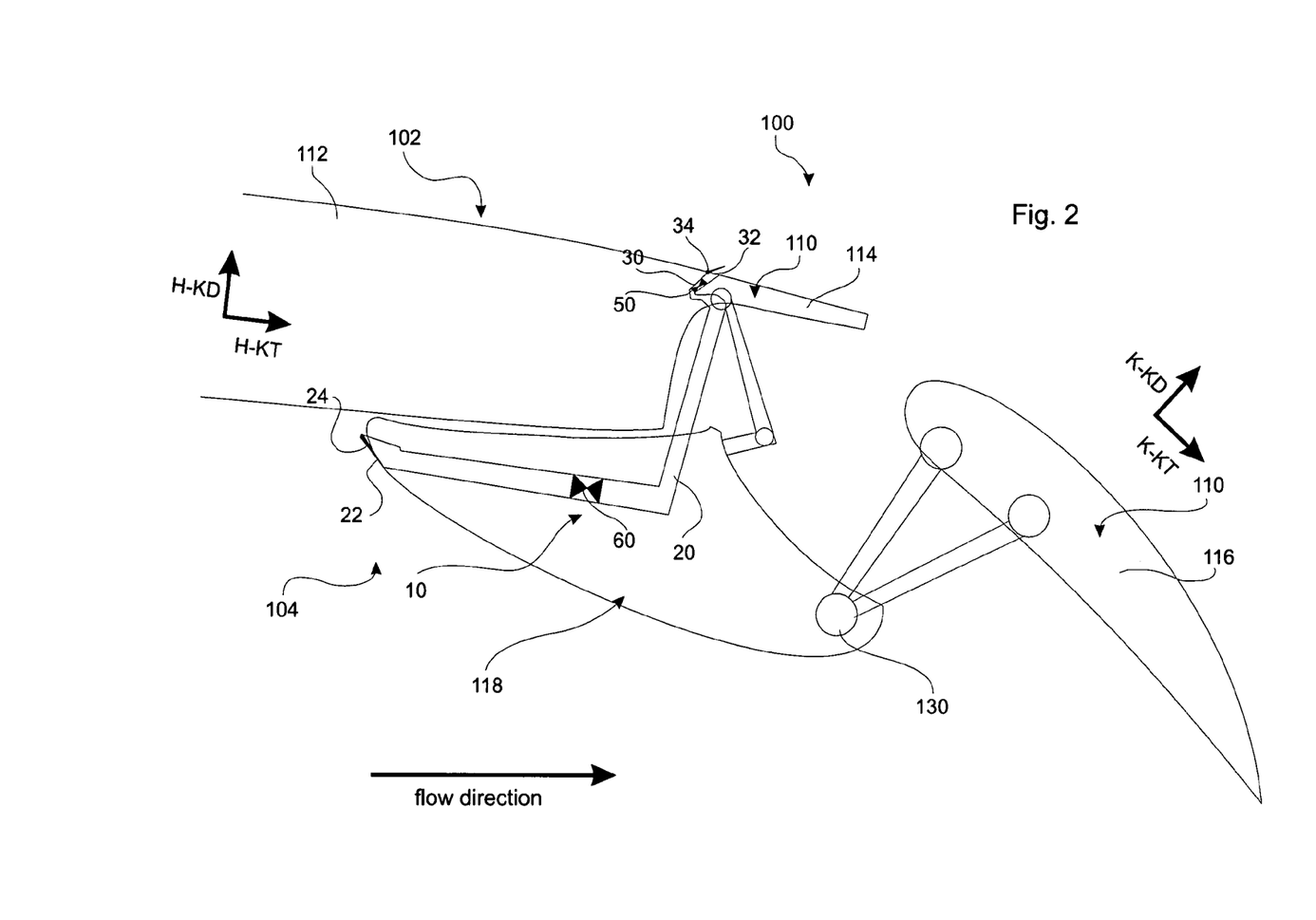
FIG. 2 shows a second example embodiment of the present invention.

FIG. 2 shows a further example embodiment of a high lift system 100. In contrast to the example embodiment shown in FIG. 1, here in FIG. 2 the flow control device 10 is provided not for the trailing edge flap 116, but rather for the regulating flap 110 on the main wing 112, i.e. the spoiler 114. Here the inlet duct 20 of the flow control device 10 is once again arranged within the fairing 118 and exits from the latter upwards in the direction of the main wing 112 in the region of the latter in the vicinity of the spoiler 114. There it enters into the fairing of the main wing 112 and the spoiler 114 and discharges into the exit duct 30. In the outlet duct 30 is arranged a flow variator 50, which releases a pulsating flow of air into the outlet duct 30, and thus enables a pulsating control via the outlet 32 of the flow on the spoiler 114.

Both the inlet 22 and also the outlet 32 of the flow control device 10 are once again provided with opening and closing devices 24 and 34. The inlet opening and closing device 24 in FIG. 2 is now represented in the closed state. In this state the flow control device is therefore inactive in fluid mechanics terms, in other words, it is non-operational. In fact the flow on the lower face 104 of the high lift system 100 is not controlled and flows past the fairing 118.

In the interior of the inlet duct 20, a control valve 60 is provided to restrict the airflow in the flow control device. Thus, with a fully open inlet opening and closing device 24, the quantity of air within the inlet duct 22 can be further varied. In the event that, for example, under cruise flight conditions, or during rapid flight manoeuvres, a high quantity of air enters into the inlet duct 20 via the inlet 22 that is too large, however, for the desired control of the regulating system, this can be restricted via the control valve 60. Thus only a defined quantity of air passes through the further course of the inlet duct 20 to enter the flow variator 50, which can perform its flow control variation task and generates a defined and pulsating flow via the outlet 32 onto the upper face of the spoiler 114.

Figure 3:
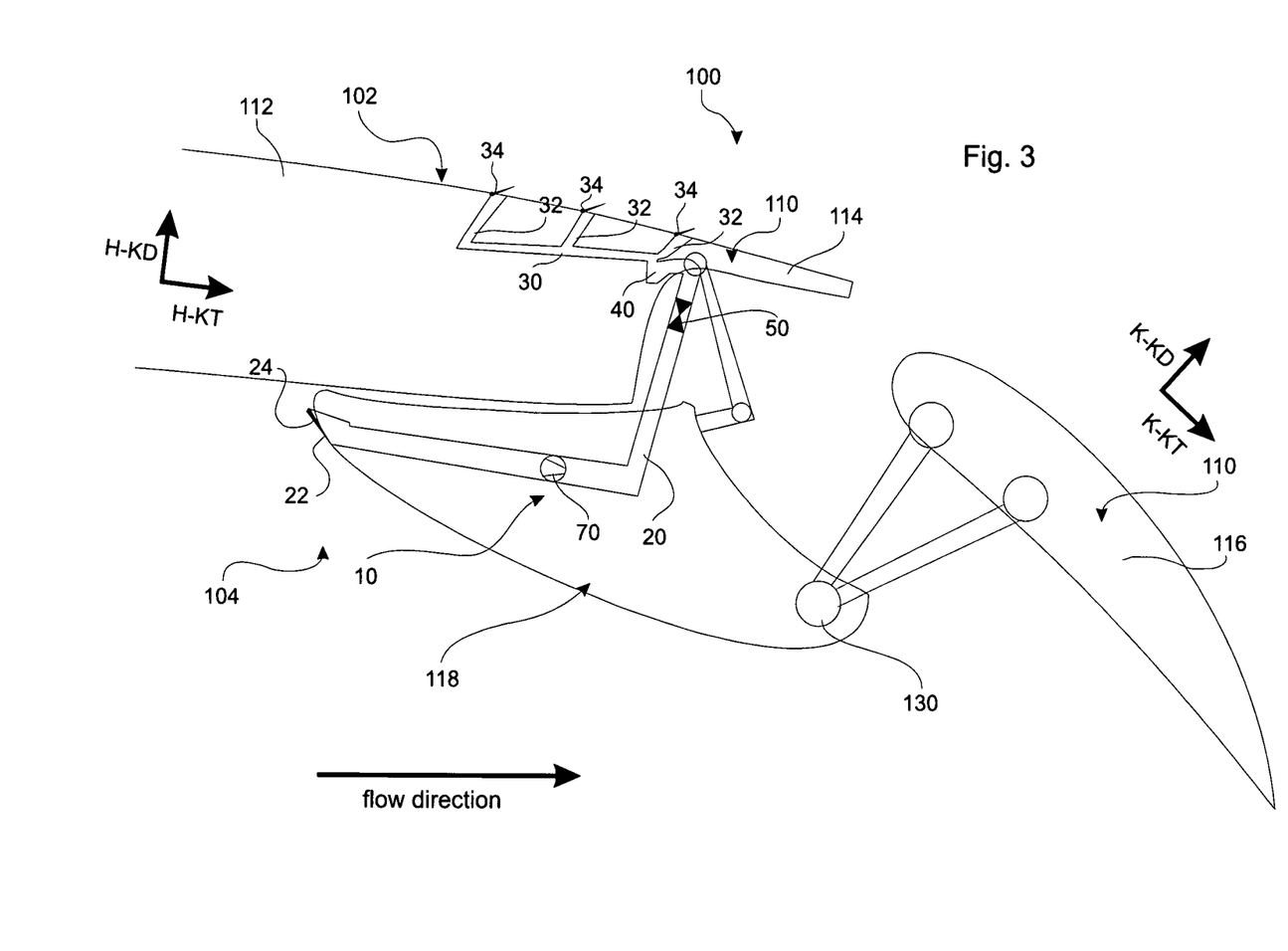
FIG. 3 shows a third example embodiment of the present invention.

FIG. 3 is a variation of the example embodiment shown in FIG. 2. Thus, in this example embodiment the outlets 32 are provided not only on the spoiler 114, but also on the main wing 112. Here two outlets 32 are provided on the upper face of the main wing 112 and one on the upper face of the spoiler 114. The two outlets 32 on the upper face of the main wing 112 therefore lie in the region of the spoiler 114 as a regulating flap. In this manner an even more effective flow control is possible with a flow control device 10. The flow on the upper face 102 of the high lift system 100 is thus controlled at a plurality of locations and can thus already be fully controlled in the region of the spoiler 114, and thus can fully deploy the effect to be achieved by the control. A flow that has already separated upstream of the spoiler 114 can in this manner be at least partially reattached, and thus reaches the spoiler 114 in a reattached state. In this manner the spoiler 114 can deploy its aerodynamic effect.

In the example embodiment shown in FIG. 3 the flow variator 50 is provided in the inlet duct 20. Here the flow variator 50 is still located upstream of the distribution duct 40 and thus upstream also of the outlet ducts 30. In this manner a single flow variator 50 can be used for a multiplicity of outlet ducts 30 and outlets 32. This has the consequence that weight can be significantly reduced. Also for a multiplicity of outlet ducts 30 and outlets 32 the costs for the flow variator 50 are incurred only once.

In addition, in the example embodiment shown in FIG. 3 a pump 70 is once again provided in the inlet duct 20; under low-speed flight conditions this can, for example, generate an underpressure suction in the region of the inlet 22, so as to ensure, even under such flight conditions, a sufficient supply of air to the flow on the upper face 102 of the high lift system 100.

Figure 4:
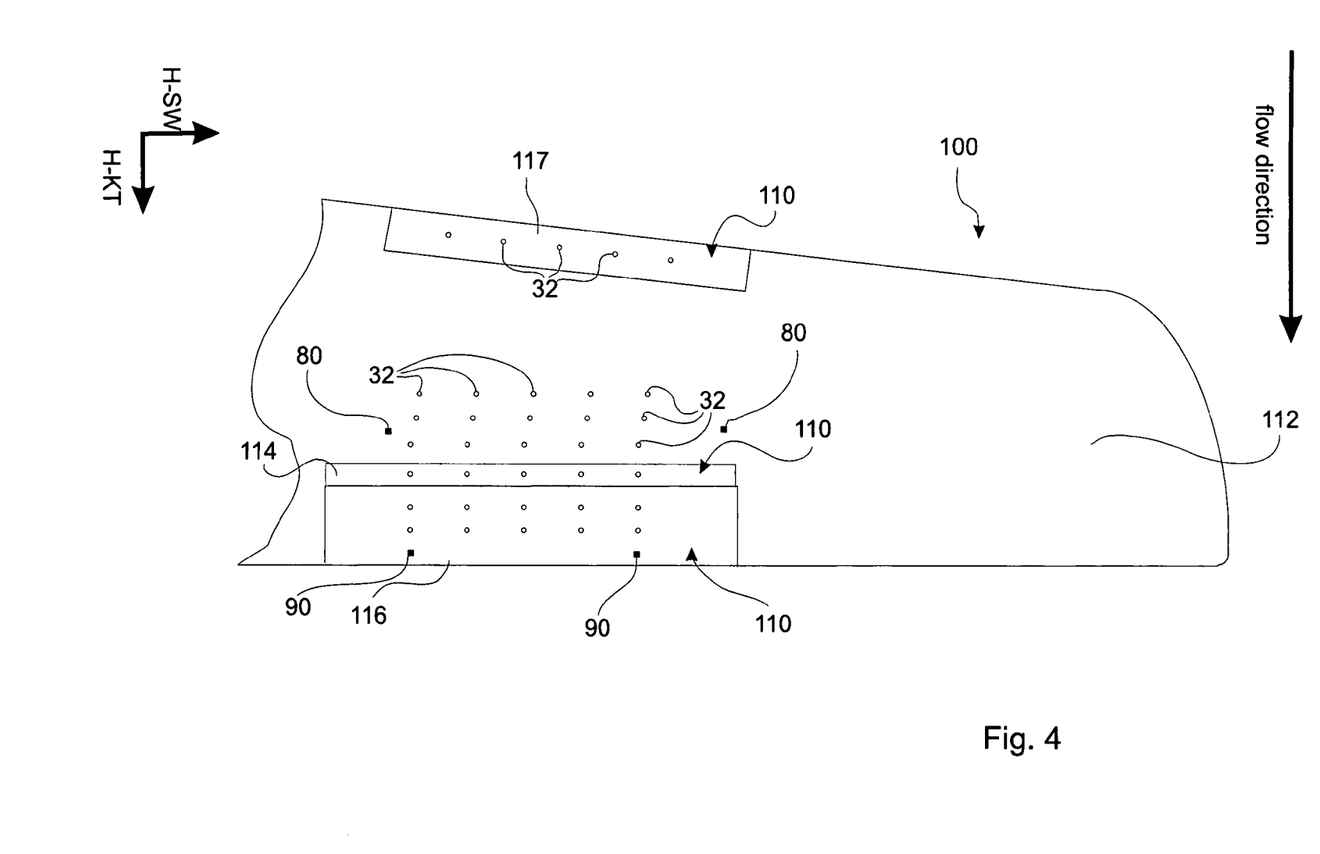
FIG. 4 shows a plan view onto a high lift system in accordance with an embodiment of the invention.

FIG. 4 shows a plan view onto a high lift system 100. On this plan view are shown a multiplicity of possible arrangements of outlets 32. Here outlets 32 are provided on all regulating flaps 110, as also on the main wing 112 itself. On the leading edge of the main wing 112 a leading edge flap 117 is provided with outlets 32 of a flow control device 10. On the trailing edge of the main wing 112 a trailing edge flap 116 is provided, which also has outlets 32 for control of the flow on the upper face 102 of the high lift system 100. Outlets 32 are likewise provided on a spoiler 114. Outlets 32 are also provided in the region ahead of the spoiler, here in the main wing chordwise direction more than three times the projection of the spoiler 114 on the main wing 112 itself. These already control the flow on the upper face 102, before the flow reaches the spoiler 114 and the trailing edge flap 116. Thus it is possible for the flow to have already been controlled on its arrival at the respective regulating flap 110, such that avoidance, or delay, of separation of the flow, or even its reattachment, can be achieved even more efficiently. Here in an example embodiment shown in FIG. 4 separate flow control devices 10 can be provided for each regulating flap 110, and common flow control devices 10 can also be provided for two or a plurality of regulating flaps 110.

Figure 5:
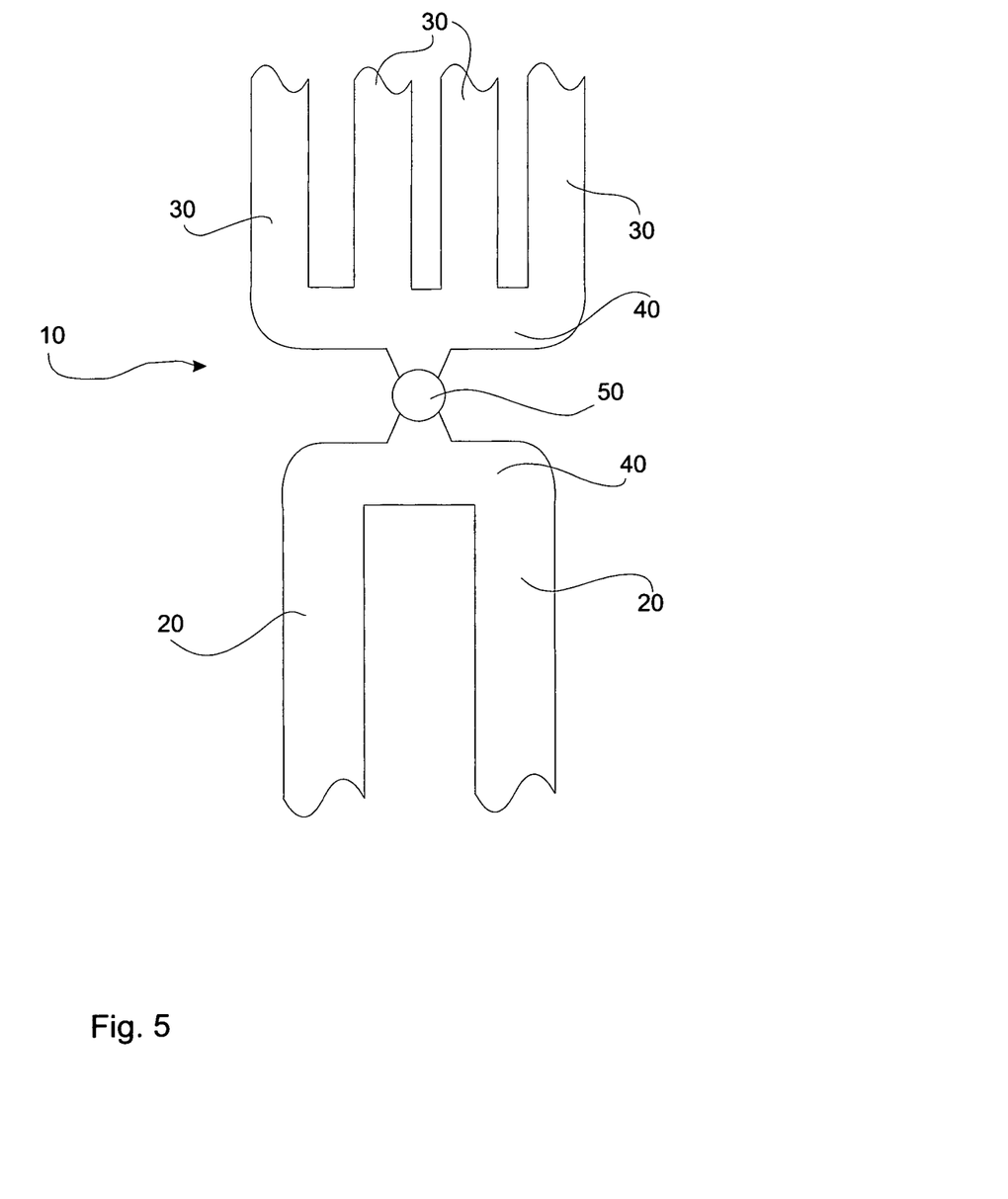
FIG. 5 shows a schematic representation of a flow control device.

FIG. 5 shows an example embodiment for a flow control device, in which a significantly more efficient form of design has been selected. Thus two symmetrical inlet ducts 20 are provided, which discharge together into a first distribution duct 40. As seen in terms of the direction of flow a central flow variator 50 is located in the connecting region; this can vary the flow out of the inlet ducts 20, in particular in a pulsating manner. In the connecting region a further distribution duct 40 is provided, via which the varied, in particular, pulsating flow is distributed across three, or even more, outlet ducts 30. This example embodiment has a multiplicity of advantages. Thus via the symmetrical arrangement with a large cross-section of two inlet ducts 20 a defined quantity of air can be introduced into the system. Furthermore, with the provision of a first and second distribution duct 40 a single flow variator 50 is sufficient. This saves not only with regard to the total weight of the system, but also, moreover, with regard to the complexity. Thus here there is only a single flow variator 50 to activate and regulate. In this example embodiment shown in FIG. 5 a total of four outlet ducts 30 can be served via the second distribution duct 40, but in other examples of embodiment, such as for example in FIG. 4, significantly more, i.e. a multiplicity of outlet ducts 30 can be served, such that the multiplicity of outlets 32 represented in FIG. 4 can be served with a relatively small number of inlet ducts 20. In summary, with a high lift system 100 in accordance with an embodiment of the invention, the inlets 22 with the corresponding inlet ducts 20 can be designed in accordance with the aerodynamic requirements and the required quantity of air, while the outlet ducts 30 and the corresponding outlets 32 can be distributed as a function of the flow separation conditions on the upper face 102 of the high lift system 100. Complex, heavy and expensive elements, such as for example the flow variator 50, pumps 70, or control valves 60, can be reduced to a minimum by the deployment of distribution ducts 40 and by multiple usage.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

REFERENCE SYMBOL LISTS 10 flow control device
20 inlet duct
22 inlet
24 inlet opening and closing device
30 outlet duct
32 outlet
34 outlet opening and closing device
40 distribution duct
50 flow variator
60 control valve
70 pump
80 load sensor
90 flow sensor
100 high lift system
102 upper face of the high lift system
104 lower face of the high lift system
110 regulating flap of the high lift system
112 main wing
114 spoiler
116 trailing edge flap
117 leading-edge flap
118 fairing
120 positioning device
130 bearing device
H-KT main wing chordwise direction
H-KD main wing thickness direction
H-SW main wing spanwise direction
K-KT regulating flaps chordwise direction
K-KT regulating flaps thickness direction

What is claimed is:

1. A high lift system comprising:
a main wing,
at least one regulating flap coupled to the main wing,
at least one guiding device configured to guide the movement of the at least one regulating flap,
at least one adjusting device configured to adjust the at least one regulating flap,
a fairing, and
a flow control device configured to control the flow around the high lift system and comprising:
at least one inlet duct comprising:
at least one inlet,
wherein the at least one inlet is located on or underneath a lower face of the high lift system,
wherein the lower face of the high lift system faces a pressure side of the at least one regulating flap,
at least one outlet duct connected with the inlet duct in a fluid-communicating manner, and comprising:
at least one outlet,
wherein the at least one outlet is located on an upper face of the high lift system in the region of the at least one regulating flap,
wherein the upper face of the high lift system faces a suction side of the at least one regulating flap;
wherein at least one of the respective guiding devices and adjusting devices are at least partially provided within the fairing,
wherein the flow control device is arranged at least partially within the fairing and the inlet duct at the location of the at least one inlet runs along the main wing chordwise direction.

2. The high lift system in accordance with claim 1, wherein the at least one inlet is configured as an opening in the fairing and is disposed at a region of the fairing which is facing the main wing chordwise direction.

3. The high lift system in accordance with claim 1, wherein an inlet opening and closing device is provided for the at least one inlet.

4. The high lift system in accordance with claim 1, wherein an outlet opening and closing device is provided for the at least one outlet.

5. The high lift system in accordance with claim 3, wherein the inlet opening and closing device is coupled kinematically with the at least one adjusting device for a regulating flap of the high lift system, such that the opening status of the inlet opening and closing device is determined by the setting of the regulating flap.

6. The high lift system in accordance with claim 5, wherein a degree of the opening of the inlet opening and closing device is a function of the setting of the regulating flap.

7. The high lift system in accordance with claim 1, wherein a control valve or a pump is provided in at least one of the at least one inlet duct and in the at least one outlet duct to control the volumetric flow within the flow control device.

8. The high lift system in accordance with claim 1, wherein a flow variator is provided for systematic variation of the flow of air through the flow control device.

9. The high lift system in accordance with claim 8, wherein the flow variator is configured as a passively operating valve or as a pump.

10. The high lift system in accordance with claim 8, wherein the flow variator is arranged in the region of the at least one outlet or the outlet duct.

11. The high lift system in accordance with claim 1, wherein an activation device is provided for receipt of flight state data and generation of control signals, such that the flow control device can be activated and deactivated under particular flight conditions.

12. The high lift system in accordance with claim 11, wherein the activation and deactivation occurs through adjustment of an opening state of an inlet opening and closing device of the at least one inlet and/or an opening state of an outlet opening and closing device of the at least one outlet.

13. The high lift system in accordance with claim 1, wherein a distribution duct is provided between the at least one inlet duct and the at least one outlet duct.

14. The high lift system in accordance with claim 1, wherein the at least one inlet duct is in fluid communication with a further aircraft system selected from an air conditioning system, a hydraulic system, or a pneumatic system.

15. A flow control device in accordance with claim 1, wherein the ducts are modifiable at least partially in their axial projection by at least one of telescopic ducts and a bellows hose.

16. An aircraft having at least one high lift system with the features of claim 1.

17. The high lift system in accordance with claim 4, wherein the outlet opening and closing device is coupled kinematically with the adjusting device for a regulating flap of the high lift system, such that the opening status of the outlet opening and closing device is determined by the setting of the regulating flap.

18. The high lift system in accordance with claim 1, wherein the at least one inlet comprises an inlet opening and closing device, and the at least one outlet comprises an outlet opening and closing device, such that one or both of the inlet opening and closing device and the outlet opening and closing device is coupled kinematically with the adjusting device for a regulating flap of the high lift system, such that the opening status of each respective opening and closing device is determined by the setting of the regulating flap.

* * * * *